United States Patent
Kathman, Jr. et al.

(10) Patent No.: US 11,105,380 B2
(45) Date of Patent: Aug. 31, 2021

(54) WHEEL END DISCONNECT SYSTEM AND METHOD

(71) Applicant: Ford Global Technologies, LLC, Dearborn, MI (US)

(72) Inventors: Thomas Eugene Kathman, Jr., Livonia, MI (US); Gregory D. Gardner, Livonia, MI (US); Norman Jerry Bird, Plymouth, MI (US); Diana Barbara Placha, Westland, MI (US); Xiaoyong Lu, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 111 days.

(21) Appl. No.: 16/520,256

(22) Filed: Jul. 23, 2019

(65) Prior Publication Data

US 2021/0025460 A1    Jan. 28, 2021

(51) Int. Cl.
| | |
|---|---|
| *F16D 11/16* | (2006.01) |
| *F16D 27/09* | (2006.01) |
| *F16D 27/01* | (2006.01) |
| *B60K 17/02* | (2006.01) |
| *F16D 121/20* | (2012.01) |
| *B60K 17/35* | (2006.01) |

(52) U.S. Cl.
CPC .............. *F16D 11/16* (2013.01); *B60K 17/02* (2013.01); *B60K 17/3515* (2013.01); *F16D 27/01* (2013.01); *F16D 27/09* (2013.01); *F16D 2121/20* (2013.01); *F16D 2300/08* (2013.01); *F16D 2300/14* (2013.01)

(58) Field of Classification Search
CPC .......... F16D 11/16; F16D 27/01; F16D 27/09; F16D 27/102; F16D 2121/20; F16D 2300/08; F16D 2300/14; B60K 17/02; B60K 17/3515
See application file for complete search history.

(56) References Cited

U.S. PATENT DOCUMENTS

| | | | |
|---|---|---|---|
| 2016/0131206 A1* | 5/2016 | Essenmacher | F16D 48/064 192/84.1 |
| 2017/0204917 A1* | 7/2017 | Bird | F16D 27/09 |
| 2018/0347642 A1* | 12/2018 | Kimes | F16D 27/108 |
| 2020/0173500 A1* | 6/2020 | Yoder | F16D 48/064 192/84.1 |

* cited by examiner

*Primary Examiner* — Charles A Fox
*Assistant Examiner* — Jessica L Burkman
(74) *Attorney, Agent, or Firm* — Vincent Mastrogiacomo; McCoy Russell LLP

(57) ABSTRACT

Methods and system are provided for locking a half shaft to a wheel hub to engage four wheel drive are disclosed. In one example, a wheel hub is locked to a half shaft via a radially expanding engagement mechanism. The radially expanding engagement mechanism is without grease and without springs.

17 Claims, 12 Drawing Sheets

WHEEL END DISCONNECT SYSTEM AND METHOD

FIELD

The present description relates generally to methods and systems for engaging and disengaging wheels of an all-wheel drive vehicle. The system and method may be particularly useful for vehicles that operate in low ambient temperatures.

BACKGROUND/SUMMARY

A vehicle may be configured as a four wheel drive vehicle to improve vehicle traction and performance. If the vehicle is continuously engaged in four wheel drive during all vehicle operating conditions, vehicle energy efficiency may be reduced due to increased driveline friction. Consequently, it may be desirable to operate the vehicle in a two wheel drive mode during some vehicle operating conditions and to operate the vehicle in a four wheel drive mode during other vehicle operating conditions. However, because of wheel end disconnect configurations, it may take more time than is desired to couple wheel hubs so that the vehicle may enter four wheel drive mode. This may be especially true during cold ambient temperature conditions when grease within wheel end disconnect mechanisms may make it more difficult to couple a half shaft to a wheel hub. In particular, the grease may increase resistance to motion within the wheel end disconnect mechanism so that it may take longer than may be desired to couple the half shaft to the wheel hub. Therefore, it may be desirable to provide a way of quickly shifting into four wheel drive that may be less sensitive to ambient temperatures.

The inventors herein have recognized the above-mentioned issues and have developed a vehicle wheel end locking device, comprising: an inner ring assembly including a radially expanding engagement mechanism; and an outer ring including a first group of teeth for receiving the radially expanding engagement mechanism.

By radially expanding an engagement mechanism to couple a wheel end disconnect, it may be possible to provide the technical result of quicker four wheel drive engagement. In particular, a wheel end disconnect device may be produced and operated that does not include grease so that cold ambient temperatures may have less effect on wheel hub locking and unlocking. In particular, pawls of a wheel end disconnect may be radially expanded to engage four wheel drive and retracted to disengage four wheel drive via an electro-magnetic actuator. The pawls and an actuator ring need not be greased to operate, and therefore, may operate more consistently over a wider range of ambient temperature operating conditions.

The present description may provide several advantages. In particular, the approach provides a grease free wheel end disconnect that may operate more consistently over a wide range of ambient temperatures and may have less tendency to receive and hold debris that may affect previous wheel end disconnect designs. Further, the approach provides positive wheel locking whether the wheel rotates clockwise or counter clockwise. Further still, the approach is free of springs. Additionally, the splines on the axle and on the wheel hub are no longer required to have a shared pitch diameter as is required with a sliding ring coupling. Also, the electro-magnetic actuator may act more quickly than vacuum power or electric motors and gear trains. In addition, the electro-magnetic actuator allows motive force to be transferred between components that have relative speed without physical contact, reducing the potential for wear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-13 are shown approximately to scale.

DETAILED DESCRIPTION

Figure 1:
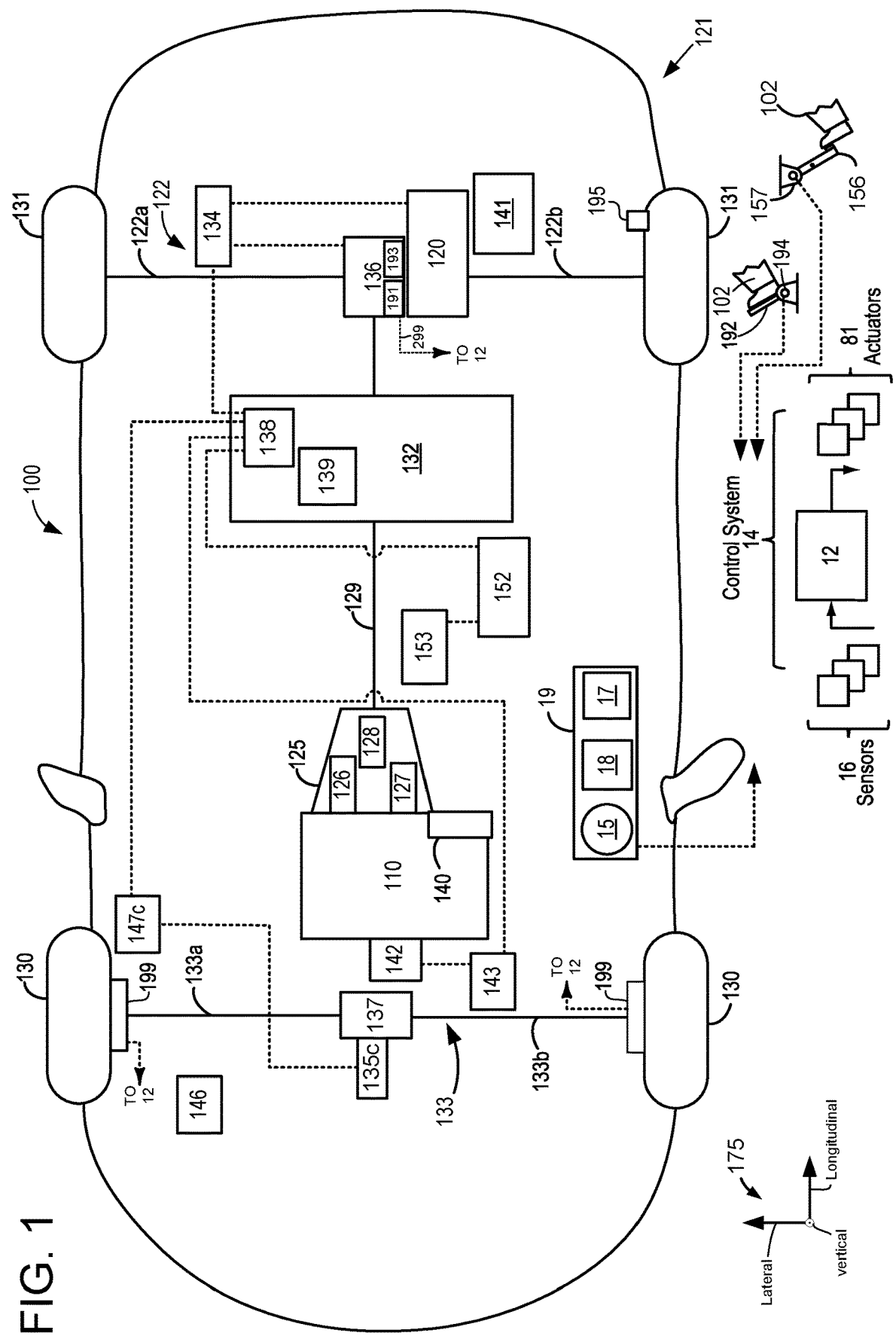
FIG. 1 is a schematic diagram of a vehicle driveline is shown.

The following description relates to systems and methods for a wheel end disconnect for engaging and disengaging wheels of a vehicle. The wheel end disconnect may be applied to front or rear wheels. Further, the wheel end disconnect system may be grease free so that an amount of time to engage the wheel end disconnect system may not be affected by cold ambient temperatures. Also, being free of grease means that when the temperature is high that the system is unable to leak. The wheel end disconnect may be applied in vehicles that include an internal combustion engine as a sole propulsion source, vehicles that include an internal combustion engine and an electric machine as propulsion sources, and vehicle that include an electric machine as a sole propulsion source. In one example, the vehicle may be a hybrid vehicle that includes an electric machine for providing propulsive force as shown in FIG. 1. The wheel end disconnect may be comprised of the components shown in FIGS. 2-13. The wheel end disconnect system may operate according to the sequence shown in FIG. 14 and according to the method of FIG. 15.

FIG. 1 illustrates an example vehicle propulsion system 100 for vehicle 121. Vehicle propulsion system 100 includes at three power sources including an internal combustion engine 110, electric machine 120, and electric machine 135c. However, in other examples, internal combustion engine 110 may be omitted. Further, in other examples, other driveline layouts may be applied. Therefore, it should be appreciated that the system of FIG. 1 is non-limiting. Electric machines 120 and 135c may be configured to utilize or consume a different energy source than engine 110. For example, engine 110 may consume liquid fuel (e.g. gasoline) to produce an engine output while electric machines 120 and 135c may consume electrical energy to produce an electric machine output (e.g., mechanical torque). As such, a vehicle with propulsion system 100 may be referred to as a hybrid electric vehicle (HEV). Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122a, and second half shaft 122b. Likewise, front axle 133 may comprise a first half shaft 133a and a second half shaft 133b that are coupled to differential gears 137. Electric machine 135c may supply mechanical power to differential gears 137. Vehicle propulsion system 100 is shown with front wheels 130 and rear wheels 131. In this example, front wheels 130 may be selectively driven via electric machine 135c and differential gars 137. Wheel end disconnects 199 may mechanically decouple front wheels 130 from electric machine 135c and first and second half shafts 133a and 133b when vehicle 121 is not operating in a four wheel drive mode. Further, wheel end disconnects 199 may mechanically couple front wheels 130 to electric machine 135c and first and second half shafts 133a and 133b when vehicle 121 is operating in a four wheel drive mode. Inverter 147c may supply alternating current to electric machine 135c by converting DC power from electric energy storage device 132 into AC power. Alternatively, inverter 147c may convert AC power from electric machine 135c into DC power for storage in electric energy storage device 132. Rear wheels 131 may be driven electrically or via engine 110.

The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drive unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1 as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. Transmission 125 may shift gears by selectively opening and closing first clutch 126 and second clutch 127.

Electric machines 120 and 135a may receive electrical power from onboard electrical energy storage device 132. Furthermore, electric machines 120 and 135a may provide a generator function to convert engine output or the vehicle's kinetic energy into electrical energy, where the electrical energy may be stored at electric energy storage device 132 for later use by the electric machine 120, electric machine 135c, or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, electric machine 135a, energy storage device 132, integrated starter/generator 142, transmission 125, wheel end disconnects 199, etc. Control system 14 may receive sensory feedback information from one or more of engine 110, electric machine 120, electric machine 135a, energy storage device 132, integrated starter/generator 142, transmission 125, etc. Further, control system 14 may send control signals to one or more of engine 110, electric machine 120, electric machine 135c, wheel end disconnects 199, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include wheel speed sensor(s) 195, throttle position sensors (not shown), etc. In some examples, sensors associated with engine 110, transmission 125, electric machine 120, wheel speed sensor 195, position sensors that describe the couple/uncouple state of the wheel end disconnect, etc., may communicate information to controller 12, regarding various states of engine, transmission, and electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 135c, electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine. Spatial orientation of vehicle 121 is indicated via axes 175.

Figure 2:
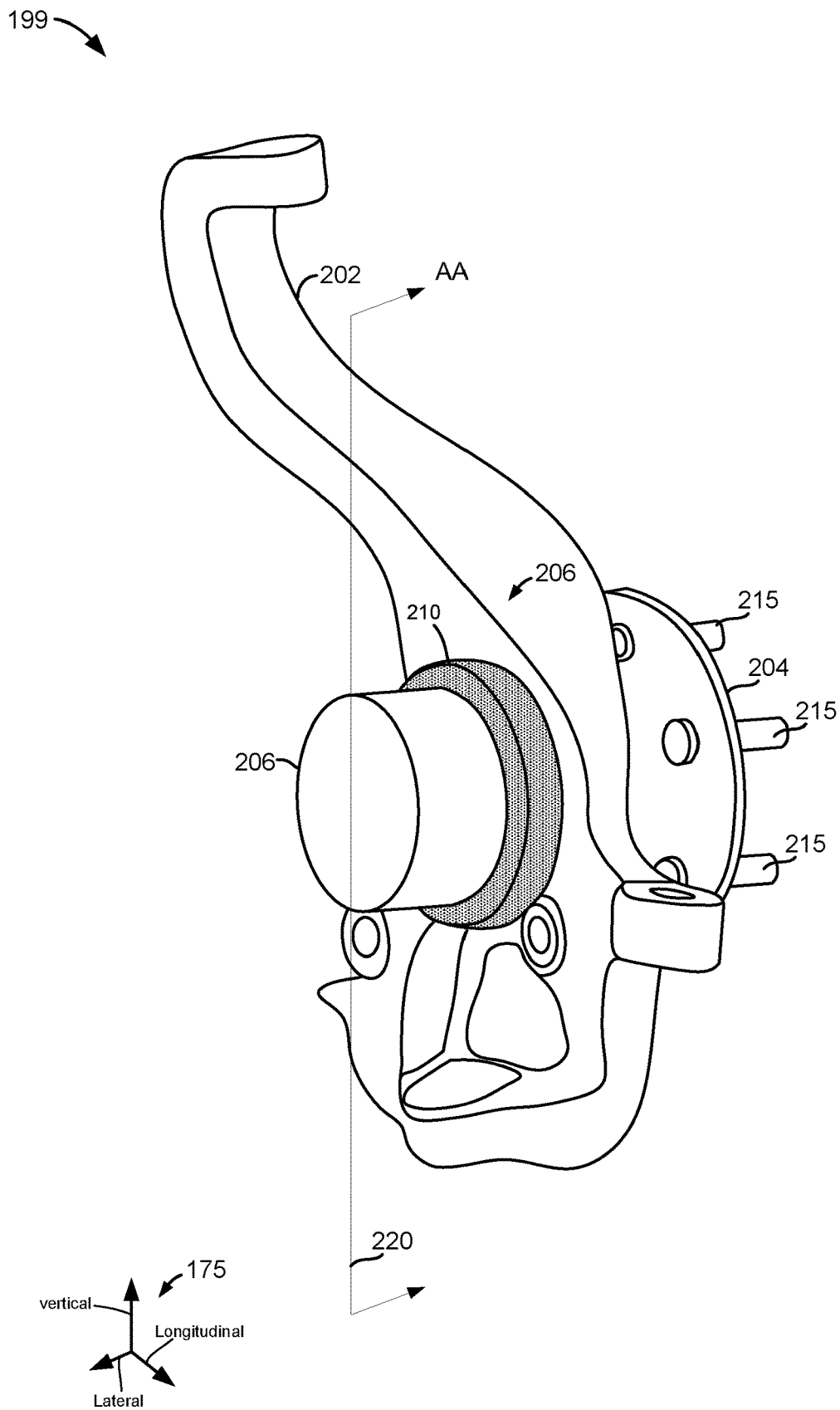
FIG. 2 shows a perspective view of an example wheel end disconnect system.
Figure 4:
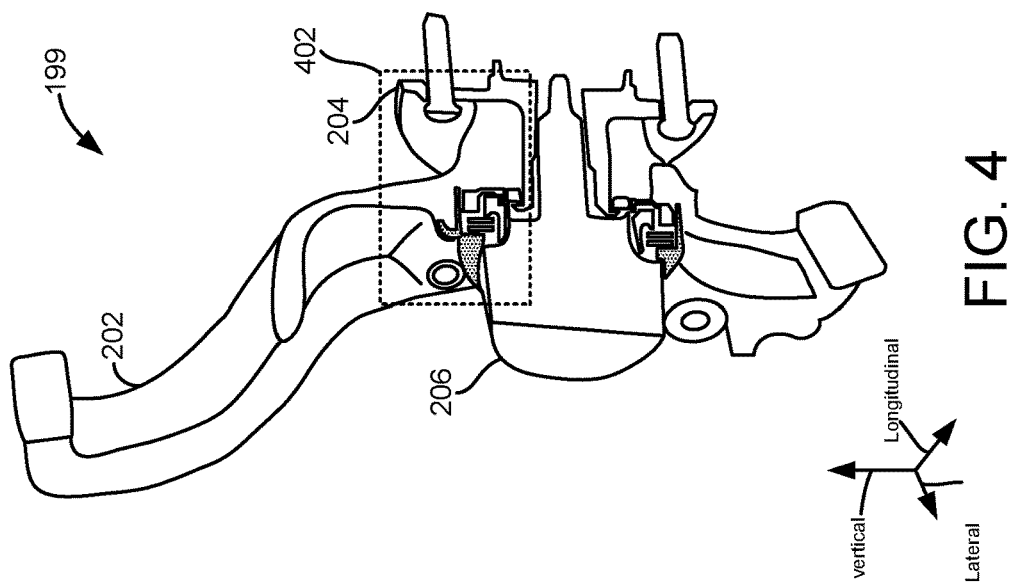
FIG. 4 shows a section perspective view of the wheel end disconnect system shown in FIG. 2.

FIG. 2 a perspective view of a wheel end disconnect system 199 is shown. Wheel end disconnect system 199 includes a knuckle 202 that supports half shaft (e.g., 133a or 133b), wheel hub 204, and wheel end disconnect mechanism 208. Knuckle 202 may be supported via the vehicle's chassis. A wheel (e.g., 130) may be mechanically coupled to wheel hub 204 via wheel bolts or studs 215 and wheel end disconnect housing 210 covers and protects the wheel end disconnect mechanism 208. Section AA is indicated at 220 and section AA is shown in FIG. 4.

Figure 3:
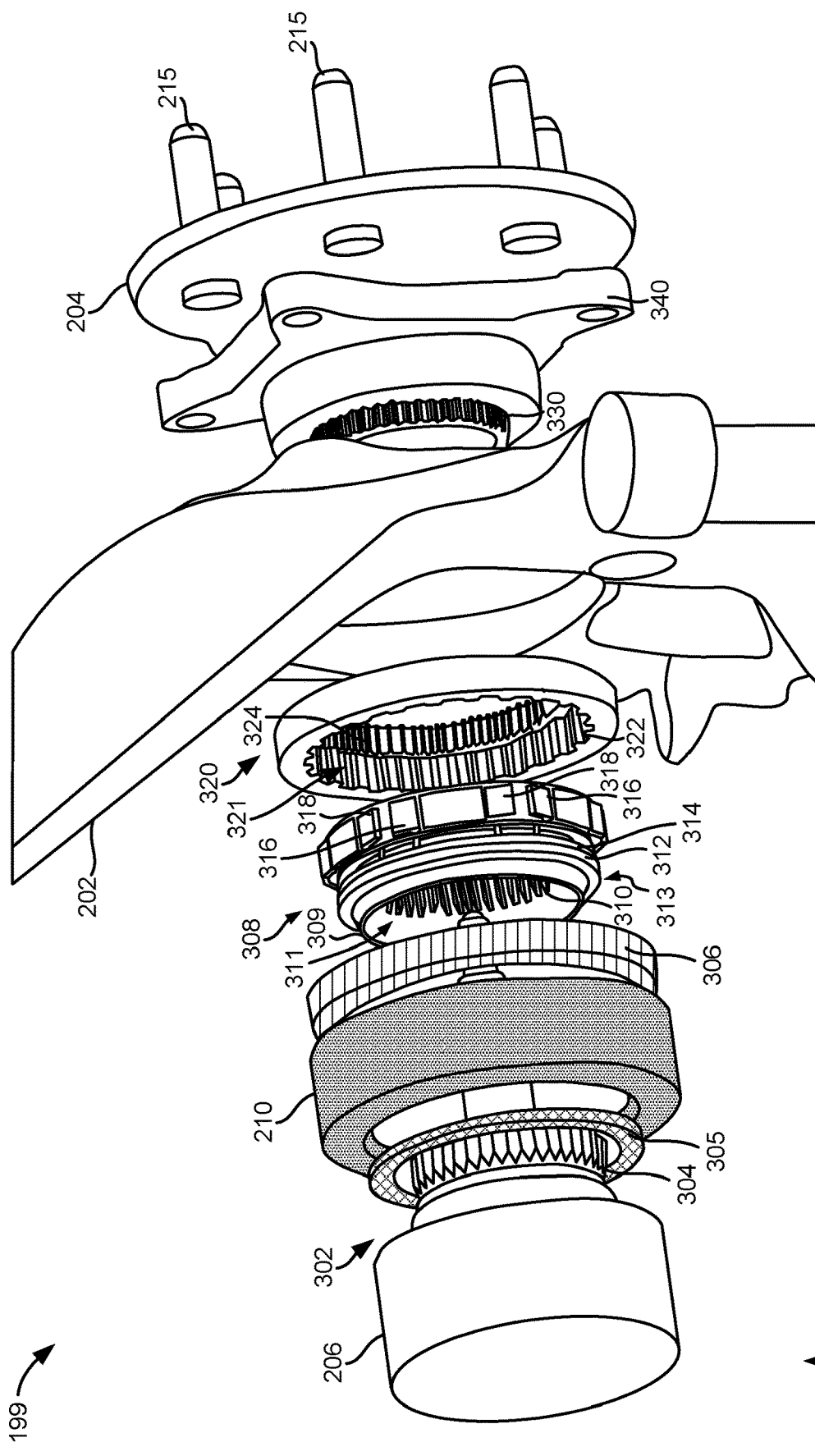
FIG. 3 shows an exploded view of the wheel end disconnect system of FIG. 2.

FIG. 3 shows an exploded view of the wheel end disconnect system 199 of FIGS. 1 and 2. Knuckle 202 supports wheel hub 204 and half shaft 206. End 302 of half shaft 206 includes male splines 304 that mesh with female splines 310 of inner ring assembly 308. Seal 305 is positioned between half shaft 206 and wheel end disconnect housing 210 to reduce the possibility of debris from entering wheel end disconnect system 199. Wheel end disconnect housing 210 covers inner ring assembly 308 and it also reduces the possibility of debris from entering wheel end disconnect system 199. Actuator coil or electro-magnet assembly 306 is also covered via housing 210 and coil assembly 306 fits over top of at least a portion of actuator ring 314.

Inner ring assembly 308 includes an inner ring 309 including female splines 310 that are located on an inside 311 of inner ring 309. Actuator ring 314 and permanent magnets 312 slip over an outside 313 of inner ring 309. Actuator ring 314 may move in a lateral direction so that clockwise rotation engaging pawls 318 and counter clockwise engaging pawls 316 move radially outward to selectively engage pawl teeth 322 of outer ring 320. Actuator pins (shown in FIGS. 9 and 10) move laterally with actuator ring 314 to engage clockwise rotation engaging pawls 318 and counter clockwise engaging pawls 316, thereby radially extending and retracting clockwise rotation engaging pawls 318 and counter clockwise engaging pawls 316 to selectively couple the inner ring assembly 308 and half shaft 206 to the outer ring 320 and the wheel hub 204. Permanent magnets 312 are coupled to actuator ring 314 and they may move within a magnetic field generated via the actuator coil or electro-magnet assembly 306 to move the actuator ring 314 laterally to engage and disengage the inner ring assembly 308 from the outer ring assembly 320.

Outer ring 320 includes pawl engaging teeth 322 and hub engaging teeth 324. Outer ring 320 may transfer torque between wheel hub 204 and half shaft 206 when clockwise rotation engaging pawls 318 and counter clockwise engaging pawls 316 are engaged with pawl engaging teeth 322. Pawl engaging teeth 322 and hub engaging teeth 324 are located on an inside 321 of outer ring 320. Hub engaging teeth 324 couple outer ring 320 to hub 204 via hub teeth 330. Hub teeth 330 rotate at a same speed as vehicle wheels and hub 204. Hub 204 is fastened to knuckle 202 via flange 340. Wheel hub assembly 199 may be constructed and operated without grease so that engagement of wheel hub assembly 199 to couple half shaft 206 to wheel hub 204 is less affected by cold weather.

Referring now to FIG. 4, section AA of FIG. 2 is shown. Section AA reveals a cross section of knuckle 202, half shaft 206, and wheel hub 204. Area 402 shows an area of section AA of FIG. 4 that is shown in greater detail in FIG. 5. Section AA shows the components of wheel end disconnect 199 in a fully assembled state. Half shaft 206 may be stationary while wheel hub 204 rotates when the wheel end disconnect is disengaged (e.g., not in four wheel drive mode). Half shaft 206 fits into hub 204.

Figure 5:
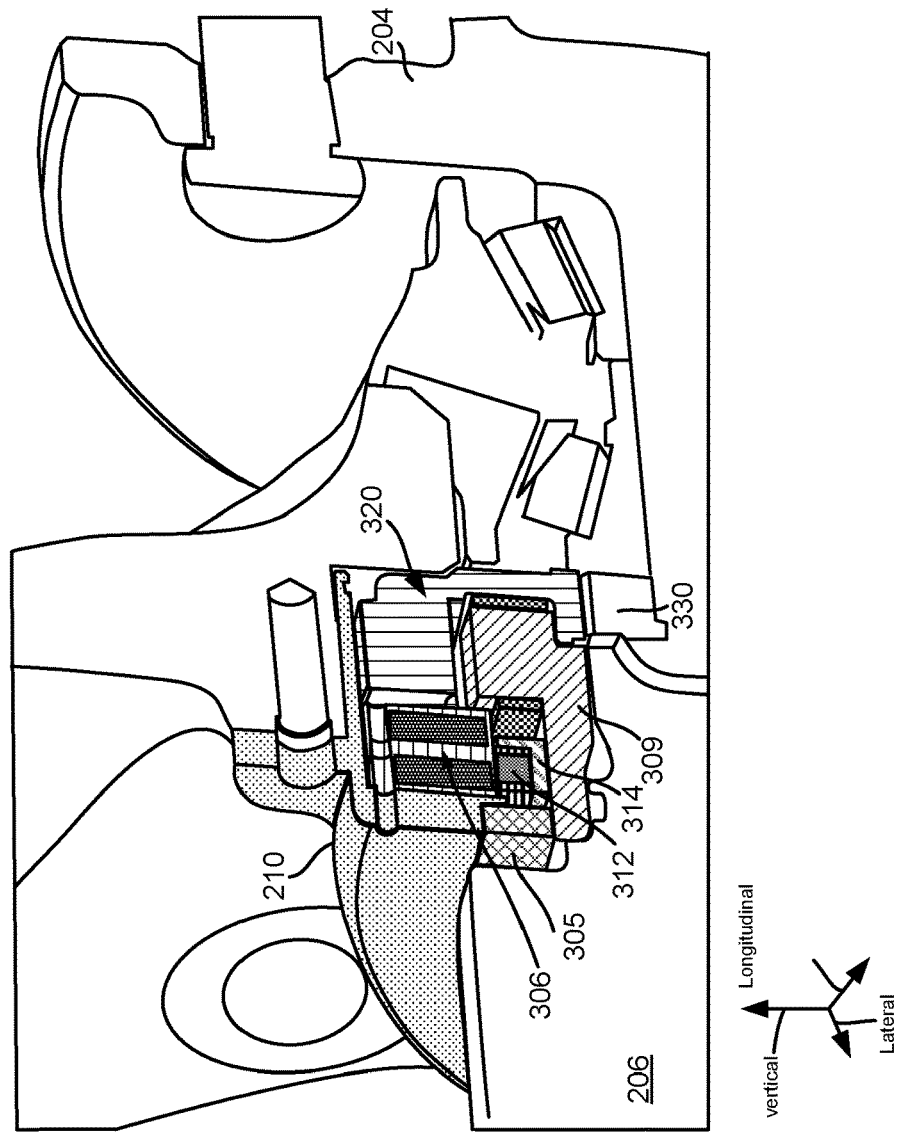
FIG. 5 is a detailed view of a portion of the section of the wheel end disconnect system illustrated in FIG. 4.

Referring now to FIG. 5, a close-up or detailed view of area 402 of FIG. 4 is shown. Wheel end disconnect housing 210 is shown coupled to hub 204 and covering actuator coil assembly 306, outer ring 320, inner ring 309, permanent magnets 312, and actuator ring 314. Inner ring 309, outer ring 320, and actuator ring are annular in shape. Hub teeth 330 engage outer ring 320 and pawls of inner ring 309 may selectively engage pawl teeth of outer ring 320 so that hub 204 rotates in unison with half shaft 206. Inner ring 309 rotates in unison with half shaft 206.

Figure 6:
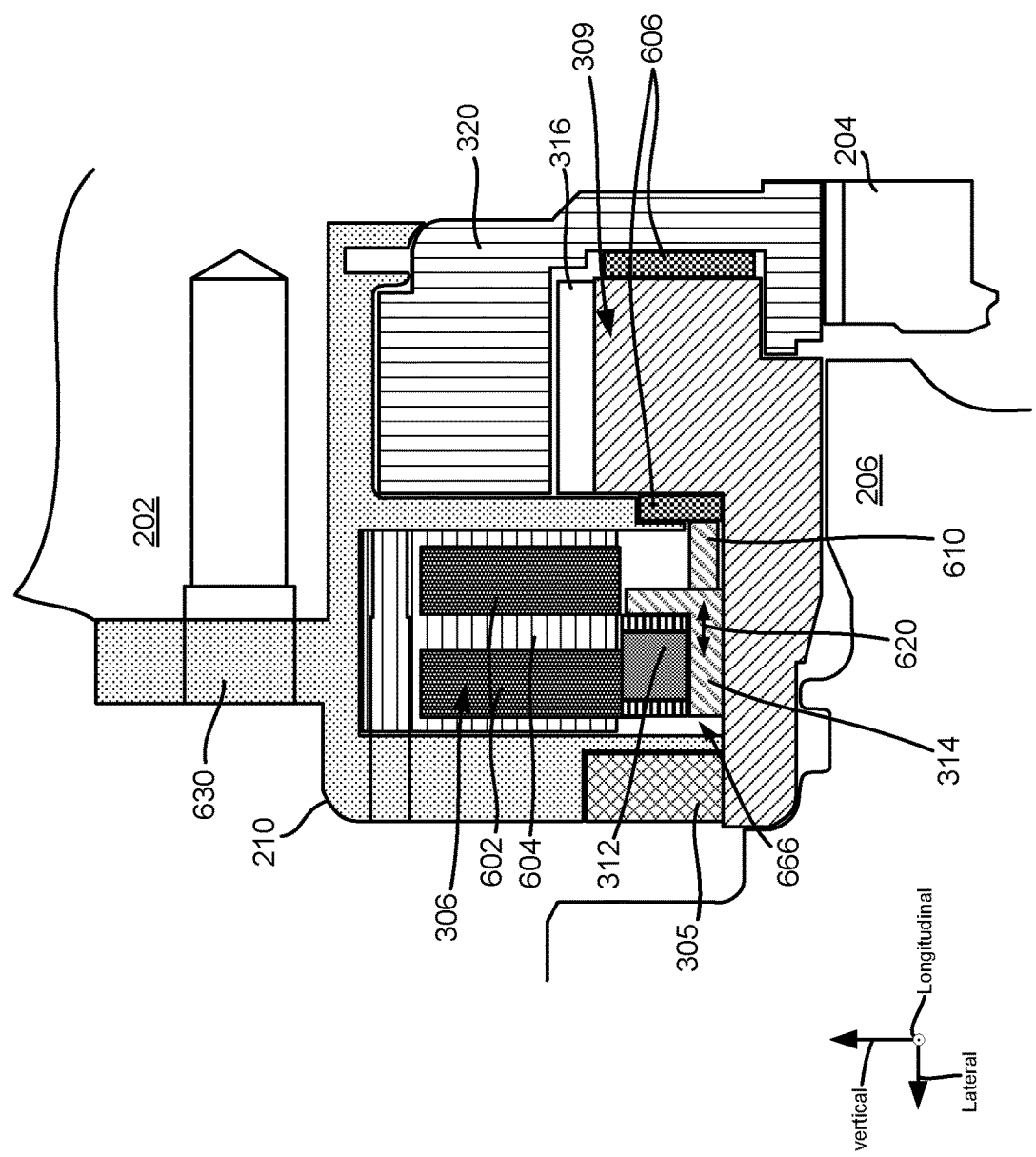
FIG. 6 a plan view of a cross-section of a wheel end disconnect actuator.

Referring now to FIG. 6, a plan view of a partial cross-section of the wheel end disconnect system 199 is shown. Wheel end disconnect housing 210 includes a plurality of through holes, one of which 630 is shown, for coupling the wheel end disconnect housing 210 to the knuckle 202. Wheel end disconnect housing 210 is shown covering electro-magnet assembly 306. Electro-magnet assembly 306 includes two annular shaped coils 602 and support 604. The electro-magnet assembly 306 is positioned radially extending beyond the radial extent of permanent magnet 312, which is also annular in shape, and actuator ring 314. Actuator ring 314 is annular in shape and it includes a plurality of actuating pins or rods 610 for extending and retracting a plurality of pawls, such as counter clockwise pawl 316. Actuator ring 314 may move laterally as indicated by arrow 620 in response to electro-magnetic assembly being activated and deactivated. In particular, actuator ring 314 may move in a first direction when a voltage of a first polarity is applied to the electro-magnet assembly 306. Actuator ring 314 may move in a direction opposite to the first direction when a voltage of a second polarity is applied to the electro-magnet assembly 306, the first and second directions indicated by arrows 620. Actuator ring 314 is part of an actuator assembly 666 that includes actuator ring 314, permanent magnet 312, and actuator pins 610.

Figure 7:
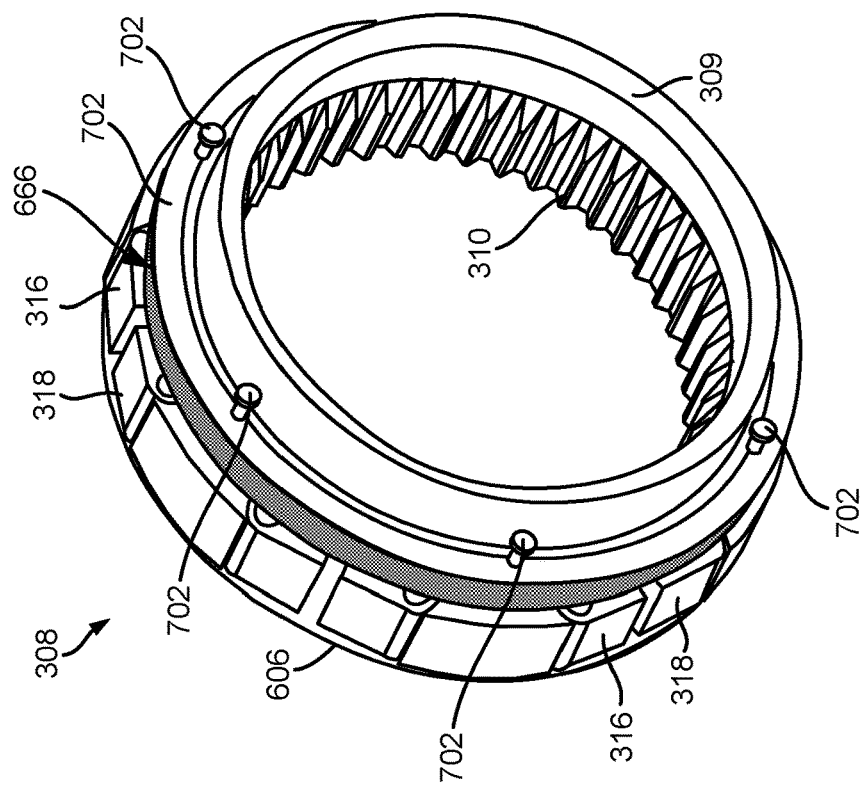
FIG. 7 a perspective view of an actuator assembly of the wheel end disconnect system in a free-wheeling position is shown.
Figure 8:
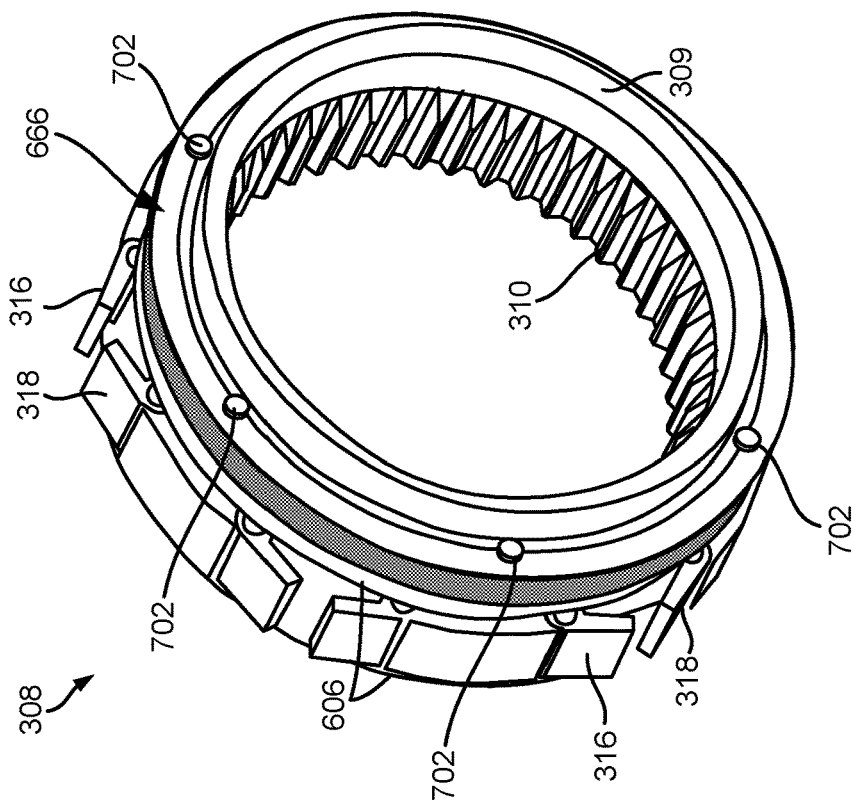
FIG. 8 a perspective view of the actuator assembly of the wheel end disconnect system in a wheel locking position is shown.

The inner ring assembly 308 includes two retaining plates 606 for capturing the clockwise rotation engaging pawls 318 and the counter clockwise engaging pawls 316 shown in FIG. 3. Actuator ring 314 rotates at a same speed as inner ring 309 and actuator ring 314 is coupled to inner ring via guide pins as shown in FIGS. 7 and 8. The length of guide pins 702 may be adjusted at a time of manufacturing to adjust a travel distance of the actuator ring 314. Outer ring 320 extends out radially from inner ring 309, and outer ring 320 may be coupled to inner ring 309 via counter clockwise engaging pawls 316. Outer ring is mechanically coupled to hub 204 via teeth or splines (not shown).

Figure 10:
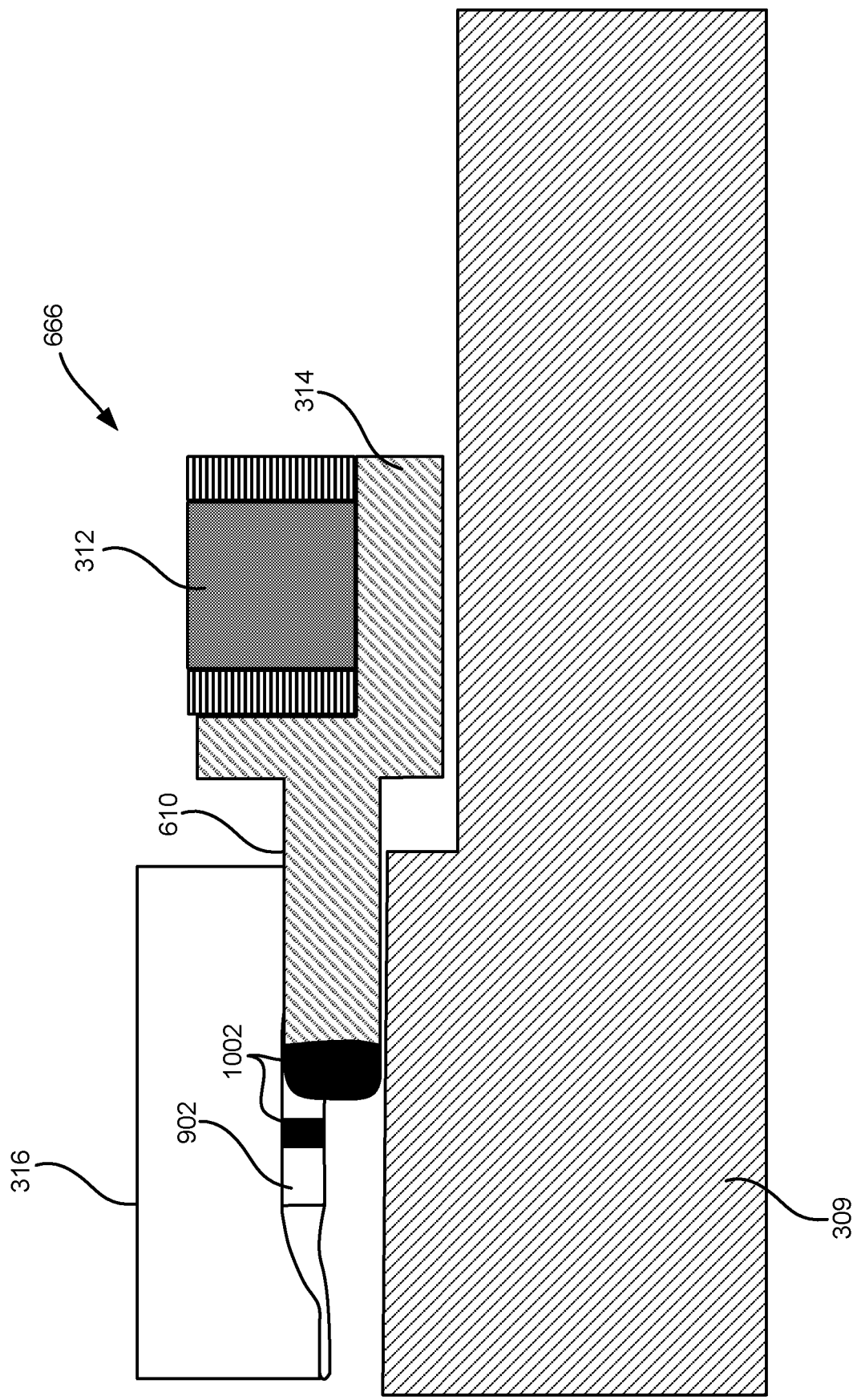
FIG. 10 a section view of an actuator pin or dowel retracting pawls of the wheel end disconnect system for wheel unlocking is shown.

Referring now to FIG. 7, a perspective view of inner ring assembly 308 with pawls retracted is shown. Actuator assembly 666 is shown in a retract position whereby actuator assembly 666 operates to retract clockwise rotation engaging pawls 318 and the counter clockwise engaging pawls 316 from outer ring 320. Actuator assembly 666 advances laterally toward clockwise rotation engaging pawls 318 and the counter clockwise engaging pawls 316 in the retract position. FIG. 10 shows the actuator assembly 666 in the retract position. Actuator pins (not shown) that are coupled to the actuator ring (not shown) apply a force to retract clockwise rotation engaging pawls 318 and the counter clockwise engaging pawls 316 such that clockwise rotation engaging pawls 318 and the counter clockwise engaging pawls 316 cannot engage the outer ring 320 and the pawl teeth 324.

Guide pins 702 allow actuator assembly 666 to move laterally so that clockwise rotation engaging pawls 318 and the counter clockwise engaging pawls 316 may be retracted. Guide pins 702 also constrain rotation of actuator assembly 666 relative to inner ring 309. Teeth or splines 310 are included on an inside of inner ring 309 and clockwise rotation engaging pawls 318 and the counter clockwise engaging pawls 316 are positioned on an outside of inner ring 309.

Figure 9:
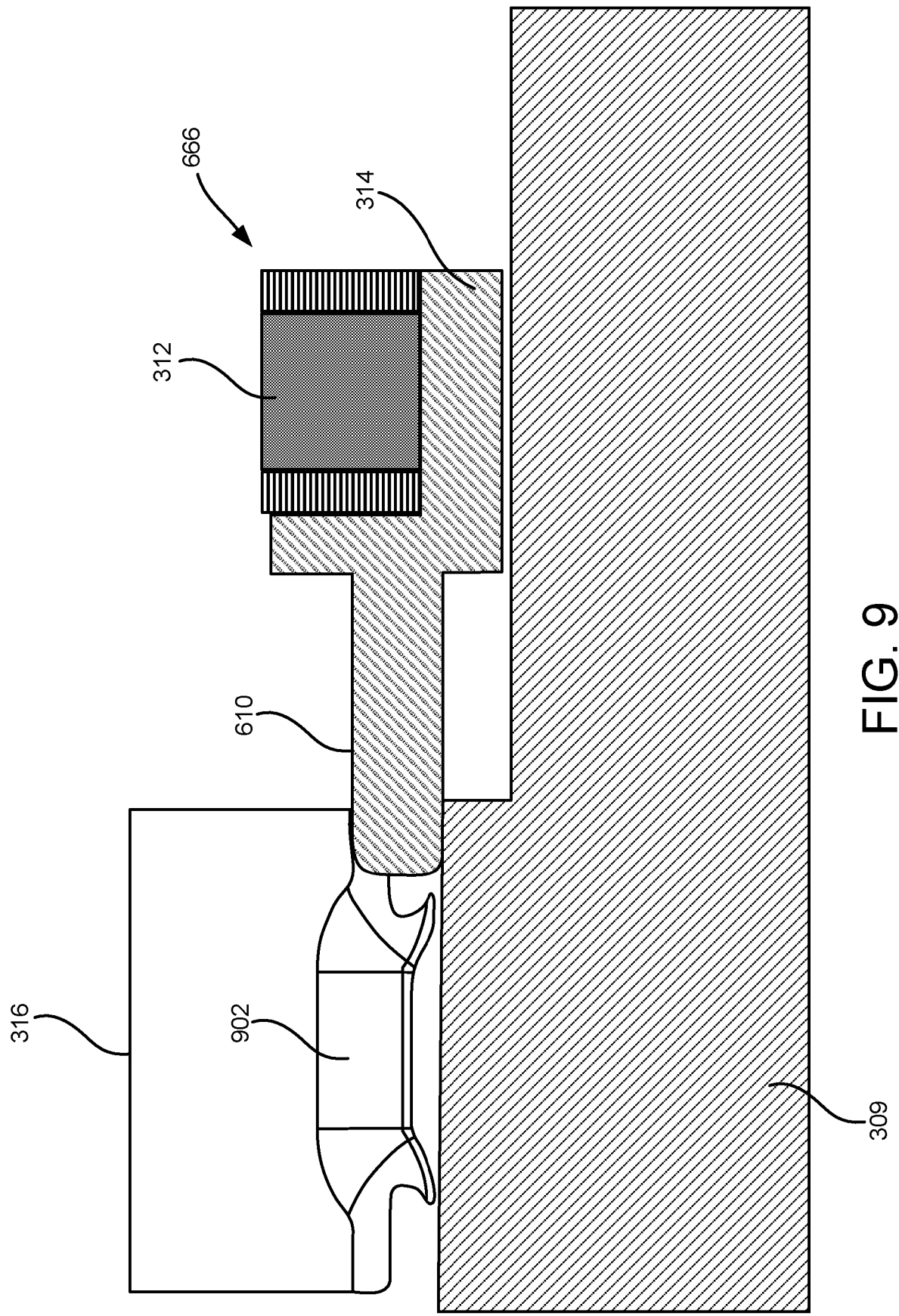
FIG. 9 a section view of an actuator pin or dowel extending pawls of the wheel end disconnect system for wheel locking is shown.

Referring now to FIG. 8, a perspective view of inner ring assembly 308 with pawls radially extended is shown. Actuator assembly 666 is shown in an extend position whereby actuator assembly 666 operates to radially extend clockwise rotation engaging pawls 318 and the counter clockwise engaging pawls 316. Actuator assembly 666 withdraws laterally away from clockwise rotation engaging pawls 318 and the counter clockwise engaging pawls 316 in the extend position. FIG. 9 shows the actuator assembly 666 in the retract position. Actuator pins (not shown) that are coupled to the actuator ring (not shown) apply a force to extend clockwise rotation engaging pawls 318 and the counter clockwise engaging pawls 316 such that clockwise rotation engaging pawls 318 and the counter clockwise engaging pawls 316 may engage the outer ring 320 and the pawl teeth 324.

Guide pins 702 allow actuator assembly 666 to be withdrawn while being retained. The guide pins 702 prevent the actuator pins from being fully withdrawn from the clockwise rotation engaging pawls 318 and the counter clockwise engaging pawls 316.

Referring now to FIG. 9, actuator assembly 666 is shown in an extend position. Actuator assembly 666 is nearly completely withdrawn from counter clockwise engaging pawl 316 in the extend position. Counter clockwise engaging pawl 316 extends out radially from inner ring 309 when actuator assembly 666 is in the extend position. Actuator pin 610 extends a small distance into counter clockwise engaging pawl 316 and applies a force to counter clockwise engaging pawl 316 via cavity 902. Cavity 902 traverses a side of counter clockwise engaging pawl 316. Cavity 902 may be spirally cut or formed to provide a cam profile (e.g., a section with a protrusion and a section absent the protrusion) into counter clockwise engaging pawl 316 so that actuator pin 610 applies a force at different locations along cavity 902 as actuator pin moves in a lateral direction, thereby causing counter clockwise engaging pawl 316 to extend or retract radially. Cavity 902 is shown being symmetric with respect to counter clockwise engaging pawl 316 so that it may operate in a same way with respect to clockwise engaging pawl 318. Electro-magnet assembly 306 (shown in FIG. 3) may apply a magnetic force to position the actuator assembly 666 in the extend position. Linear motion (e.g., motion of the actuator pin 610 in a single direction) of actuator pin 610 is translated into rotational extension of a pawl (e.g., 316 or 318). Further, moving the actuator ring 314 and the plurality of actuator pins 610 that are coupled to the actuator ring 314 is performed simultaneously via the magnetic fields of the permanent magnets 312 and the electro-magnets (e.g., coils 602 form the electro-magnet). The actuator assembly 666 operates on clockwise engaging pawls 318 in a similar way.

Referring now to FIG. 10, actuator assembly 666 is shown in a retract position. Actuator assembly 666 is nearly completely inserted into counter clockwise engaging pawl 316 in the retract position. Counter clockwise engaging pawl 316 may be in contact with inner ring 309 in a retract position. Further, counter clockwise engaging pawl 316 may not engage outer ring 320 and pawl engagement teeth when actuator assembly 666 is in the retract position. Actuator pin 610 extends nearly half way into counter clockwise engaging pawl 316 and applies a force to counter clockwise engaging pawl 316 via cavity 902. Cavity 902 traverses a side of counter clockwise engaging pawl 316. Electro-magnet assembly 306 (shown in FIG. 3) may apply a magnetic force to position the actuator assembly 666 in the retract position. The actuator assembly 666 operates on clockwise engaging pawls 318 in a similar way.

Because the wheel end disconnect device may be free of grease, anti-corrosive and anti-friction materials (e.g., polytetrafluoroethylene, zinc, etc.) 1002 may be applied to actuator pins 610 and/or cavity 902 of the pawls.

Figure 11:
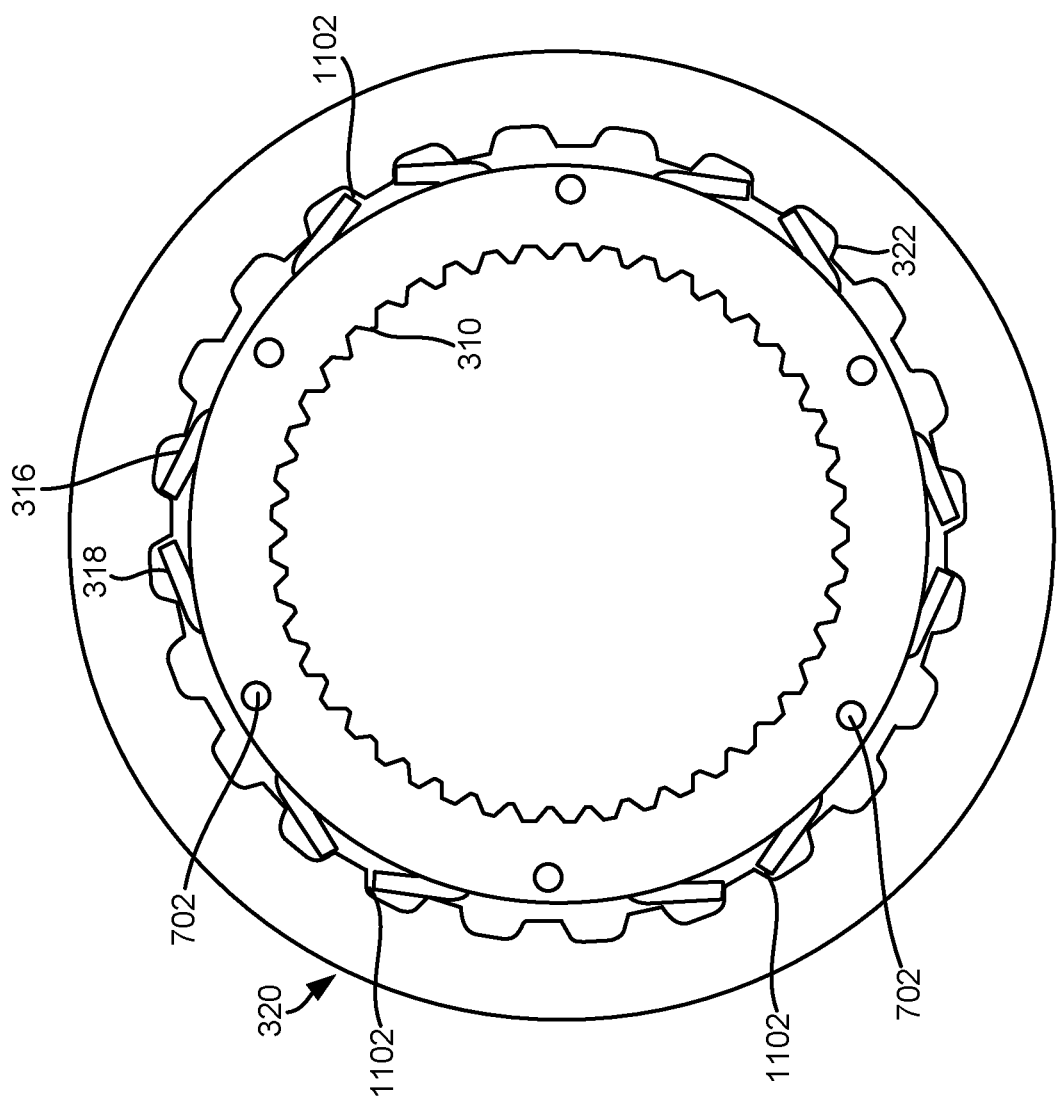
FIG. 11 shows a plan view of the actuator assembly in an engaged position with a torque transfer ring is shown.

Referring now to FIG. 11, a plan view of inner ring 309 coupled to outer ring 320 via pawls 318 and 316 is shown. In this view, actuator assembly 666 (not visible) is in an extend position so that clockwise rotation engaging pawls 318 and the counter clockwise engaging pawls 316 are extended radially outward from inner ring 309. Clockwise rotation engaging pawls 318 are shown in contact with outer ring 320, thereby locking the inner ring 309 to the outer ring 320 so that torque may be delivered from half shaft 206 to wheel hub 204 and vehicle wheels during a four wheel drive mode. A gap 1102 is shown between counter clockwise rotation engaging pawls 318 and pawl teeth 324. The gap allows the pawls to retract and decouple the inner ring 309 from the outer ring 320 so that the wheel hubs 204 may be uncoupled from the half shafts when four wheel drive mode is disengaged.

Figure 12:
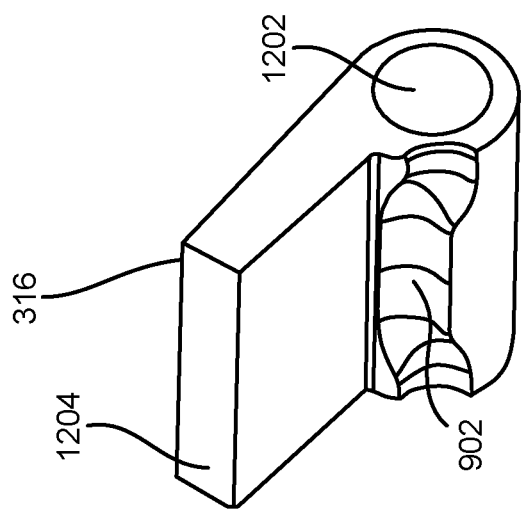
FIG. 12 shows a perspective view of a pawl of the actuator assembly.

Referring now to FIG. 12, a perspective view of counter clockwise engaging pawl 316 is shown. Counter clockwise engaging pawl 316 includes a through hole 1202 for coupling counter clockwise engaging pawl 316 to inner ring 309. A fastener (e.g., a bolt) may be placed through hole 1202 that allows counter clockwise engaging pawl 316 to rotate about the fastener while the fastener couples the counter clockwise engaging pawl 316 to the inner wheel. Counter clockwise engaging pawl 316 also includes an outer ring engaging face 1104 for coupling outer ring 320 to inner ring 309 (not shown). Cavity 902 is cut alongside of through hole 1202 so that actuator pin 610 shown in FIG. 6 may engage cavity 902 and cause counter clockwise engaging pawl to rotate about through hole 1202. Clockwise engaging pawls (not shown) may be constructed similarly to counter clockwise engaging pawl 316.

Figure 13:
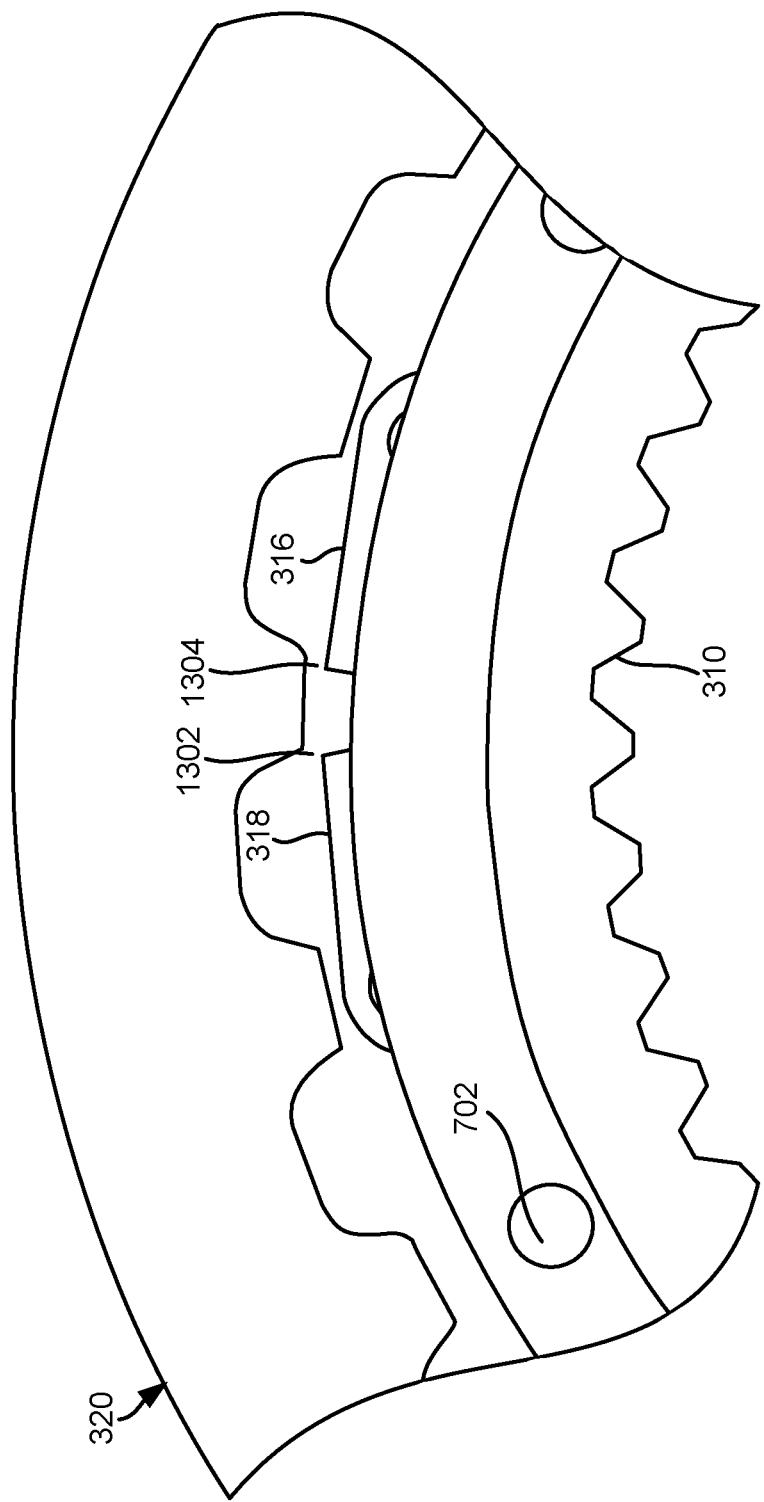
FIG. 13 shows a detailed magnified section of a free-wheeling position of the actuator assembly illustrated in FIG. 11.

Referring now to FIG. 13, a partial plan view of inner ring 309 decoupled from outer ring 320 via pawls 318 and 316 is shown. In this view, actuator assembly 666 (not visible) is in a retract position so that clockwise rotation engaging pawls 318 and the counter clockwise engaging pawls 316 are not extended radially outward from inner ring 309. Clockwise rotation engaging pawls 318 and counter clockwise rotation engaging pawls 316 are shown not in contact with outer ring 320, thereby unlocking the inner ring 309 from the outer ring 320 so that torque may not be delivered from half shaft 206 to wheel hub 204 and vehicle wheels when four wheel drive mode is not engaged. Gap 1302 is shown between counter clockwise rotation engaging pawls 318 and pawl teeth 324. The gap allows the inner ring 309 to rotate without contacting outer ring 320. Likewise, gap 1304 is shown between clockwise rotation engaging pawls 316 and pawl teeth 324. This gap also allows the inner ring 309 to rotate without contacting outer ring 320 when half shaft 206 rotates in a counter clockwise direction.

The system of FIGS. 1-13 provides for a vehicle wheel end disconnect device, comprising: an inner ring assembly including a radially expanding engagement mechanism; and an outer ring including a first group of teeth for receiving the radially expanding engagement mechanism. The vehicle wheel end disconnect device includes where the radially expanding engagement mechanism includes a plurality of pawls. The vehicle wheel end disconnect device further comprises a single actuator ring for radially extending and retracting the plurality of pawls. The vehicle wheel end disconnect device includes where the inner ring assembly includes an inner ring, the inner ring including splines, the splines configured to receive a half shaft. The vehicle wheel end disconnect device further comprises a second group of teeth included with the outer ring. The vehicle wheel end disconnect device includes where the second group of teeth and the first group of teeth are on an inside of the outer ring. The vehicle wheel end disconnect device further comprising a wheel hub coupled to the outer ring.

The system of FIGS. 1-13 also provides for a vehicle wheel end disconnect device, comprising: a spring-less mechanism including a plurality of pins for radially expanding and contracting a plurality of pawls; and an outer ring configured to receive the plurality of pawls when the plurality of pawls are extended radially. The vehicle wheel end disconnect device includes where the wheel end locking device is grease free and includes friction and corrosion coatings. The vehicle wheel end locking device further comprises one or more seals to prevent debris from entering the vehicle wheel end locking device. The vehicle wheel end disconnect device includes where each of the plurality of pawls includes a cavity configured to receive an actuator pin. The vehicle wheel end disconnect device includes where the cavity is configured to translate linear motion of the actuator pin into radial motion of one of the plurality of pawls. The vehicle wheel end disconnect device further comprises a plurality of guide pins coupled to the spring-less mechanism. The vehicle wheel end disconnect device includes an electro-magnet for adjusting a position of the spring-less mechanism.

Figure 14:
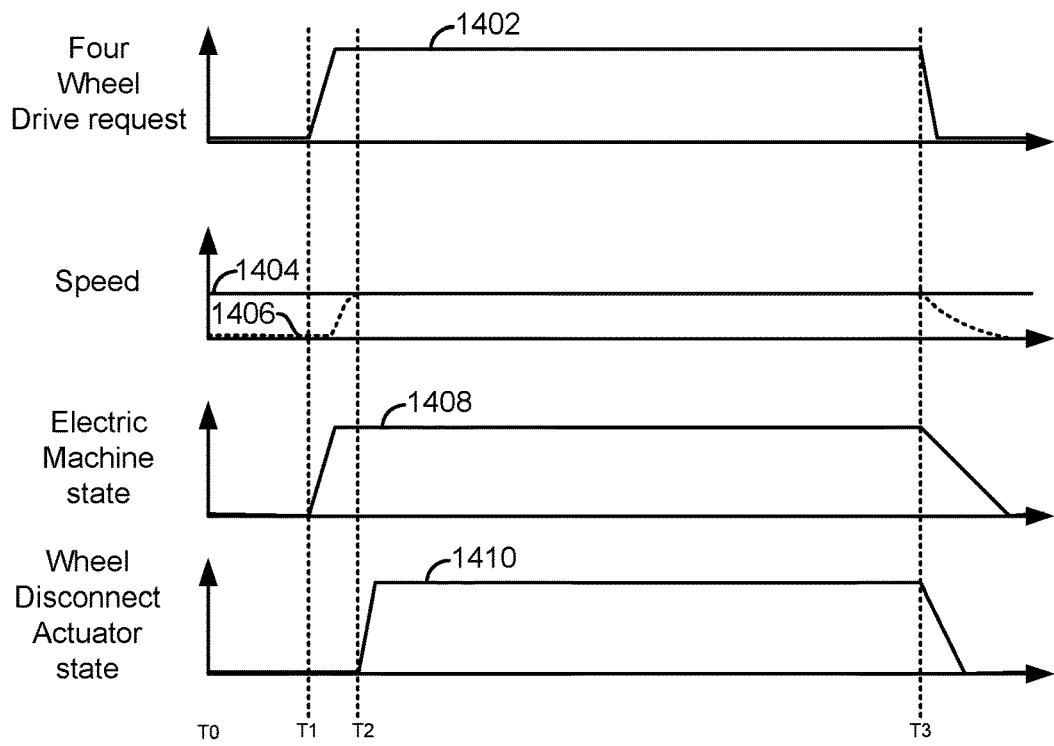
FIG. 14 shows an example sequence where the wheel end disconnect actuator is engaged and disengaged.
Figure 15:
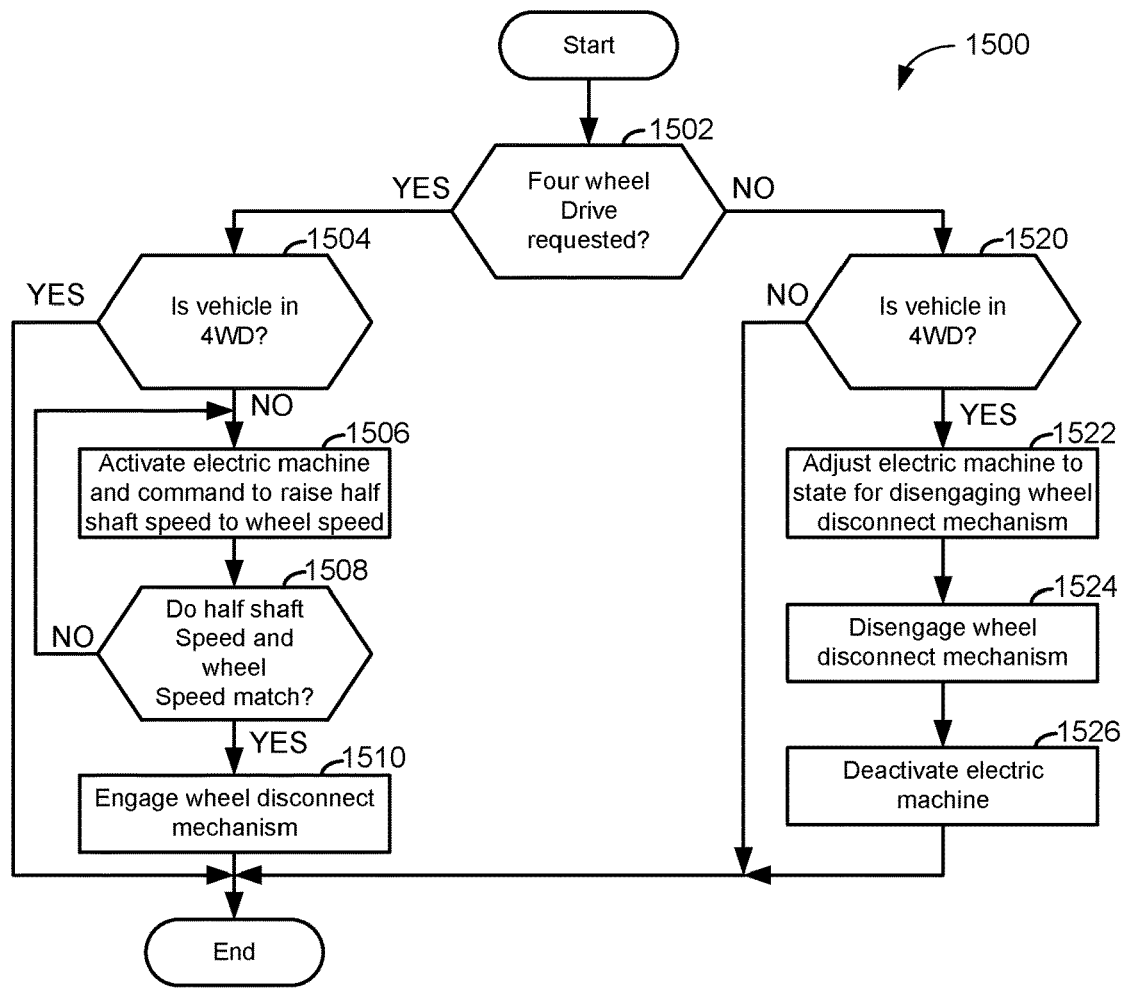
FIG. 15 an example method for engaging and disengaging the wheel end disconnect shown in FIGS. 1-13 is shown.

Referring now to FIG. 14, a prophetic operating sequence according to the method of FIG. 15 is shown. The vehicle operating sequence shown in FIG. 14 may be provided via the method of FIG. 15 in cooperation with the system shown in FIGS. 1-13. The plots shown in FIG. 14 occur at the same time and are aligned in time. The vertical lines at T0-T3 represent times of interest during the sequence.

The first plot from the top of FIG. 14 is a plot of a four wheel drive request (e.g., a request to deliver torque to all four wheels of the vehicle) versus time. The vertical axis represents an operating state of a request for four wheel drive. Four wheel drive is requested when trace 1402 is at a higher level near the vertical axis arrow. Four wheel drive is not requested when trace 1402 is at a lower level near the horizontal axis. The horizontal axis represents time and time increases from the left side of the figure to the right side of the figure. Trace 1402 represents the four wheel drive request operating state.

The second plot from the top of FIG. 14 is a plot of rotational speed versus time. The vertical axis represents rotational speed and rotational speed increases in the direction of the vertical axis arrow. The horizontal axis represents time and time increases from the left side of the figure to the right side of the figure. Line 1404 represents the rotational speed of the wheel hub and line 1406 represents the rotational speed of the half shaft.

The third plot from the top of FIG. 14 is a plot of electric machine operating state versus time. The vertical axis represents electric machine operating state and the electric machine is operating when trace 1408 is at a higher level near the vertical axis arrow. The electric machine is not operating when trace 1408 is at a lower level near the horizontal axis. The horizontal axis represents time and time increases from the left side of the figure to the right side of the figure. Trace 1408 represents the electric machine operating state.

The fourth plot from the top of FIG. 14 is a plot of wheel end disconnect actuator operating state versus time. The vertical axis represents the wheel end disconnect actuator operating state and the wheel end disconnect actuator is engaged to couple the half shaft to the wheel hub when trace 1410 is at a higher level near the vertical axis arrow. The wheel end disconnect actuator is not engaged and decouples the half shaft from the wheel hub when trace 1410 is at a lower level near the horizontal axis arrow. The horizontal axis represents time and time increases from the left side of the figure to the right side of the figure. Trace 1410 represents the wheel end disconnect actuator operating state.

At time T0, the four wheel drive is not requested and half shaft speed is zero. The wheel hub speed is non zero and the vehicle is traveling at a middle level speed. The electric machine that is coupled to the half shaft (e.g., front axle) is not activated and the wheel end disconnect is disengaged. This may allow energy to be conserved since only two vehicle wheels are driven wheels.

At time T1, the human driver (not shown) requests that the vehicle operate in four wheel drive mode. The human driver may request four wheel drive mode via a human/machine interface. The electric machine is activated in response for the vehicle to operate in four wheel drive mode and the half shaft speed begins to increase. The electric machine is commanded to a speed such that half shaft speed is equal to wheel hub speed. The wheel end disconnect actuator is not engaged since wheel hub speed is much greater than half shaft rotational speed.

Between time T1 and time T2, the half shaft speed continues to increase and the four wheel drive request remains asserted. The wheel end disconnect actuator is not engaged and the electric machine remains activated.

At time T2, the half shaft rotational speed is equal to the wheel hub rotational speed so the controller activates the wheel end disconnect actuator to engage the vehicle in four wheel drive. The four wheel drive request remains asserted. Shortly after time T2, the wheel disconnect actuator couples the haft shaft to the wheel hub and the electric machine begins to deliver torque to the wheel hubs via the wheel end disconnect actuator.

At time T3, the vehicle driver begins to withdraw the four wheel drive request and the electric machine is controlled to a state where decoupling the half shaft from the wheel hub may be conducive. In one example, torque output of the electric machine may be reduced to lower electric machine speed in response to the absence of the four wheel drive request. The wheel end disconnect clutch actuator may be disengaged when the electric machine reaches conditions that may be conducive do decoupling the half shaft from the wheel hub. Once the half shaft is uncoupled from the wheel hub, the electric machine may be deactivated. The half shaft speed decays to zero speed after the half shaft is disengaged from the wheel hub and the electric machine is deactivated.

In this way, an electric machine and a wheel end disconnect may be operated to engage and disengage four wheel drive of a vehicle. The wheel end disconnect clutch may be commanded closed once half shaft speed is equal to wheel hub speed. By equalizing the speeds of the half shaft and the wheel hub, it may be possible to reduce engagement noise and reduce engagement time.

Referring now to FIG. 15, an example method for operating a vehicle that includes wheel end disconnects is shown. The method of FIG. 15 may be incorporated into and may cooperate with the system of FIGS. 1-13. Further, at least portions of the method of FIG. 15 may be incorporated as executable instructions stored in non-transitory memory while other portions of the method may be performed via a controller transforming operating states of devices and actuators in the physical world.

At 1502, method 1500 judges if four wheel drive mode is requested. Four wheel drive mode may be requested via a human and a human machine/interface. Alternatively, four wheel drive mode may be requested via a controller sensing wheel slip. If method 1500 judges that four wheel drive mode has been requested, the answer is yes and method 1500 proceeds to 1504. Otherwise, the answer is no and method 1500 proceeds to 1520.

At 1504, method 1500 judges if the vehicle is engaged in four wheel drive (4WD). If so, the answer is yes and method 1500 proceeds to exit. Otherwise, the answer is no and method 1500 proceeds to 1506.

At 1506, method 1500 activates an electric machine that may provide propulsion force to the vehicle's driveline. Method 1500 also commands a speed of the electric machine to a speed that will match a speed of a half shaft with a wheel hub speed. In one example, method 1500 commands the speed of the electric machine to a speed of a wheel hub multiplied by a gear ratio that is between the wheel hub and the electric machine. Method 1500 proceeds to 1506.

At 1508, method 1500 judges if half shaft speed and the wheel hub speed substantially match (e.g., within +5%). Alternatively, method 1500 may judge if the half shaft speed is within a threshold speed of the wheel hub speed. For example, if the threshold speed is 10 revolutions/second, half shaft speed is 100 revolutions/second and wheel hub speed is 105 revolutions/second, then the answer is yes and method 1500 proceeds to 1508. If method 1500 judges that half shaft speed substantially matches wheel hub speed or that half shaft speed is within a threshold speed of wheel hub speed, the answer is yes and method 1500 proceeds to 1510. Otherwise, the answer is no and method 1500 proceeds to exit.

At 1510, method 1500 engages the wheel end disconnect so that pawls of the wheel end disconnect mechanically couple the inner ring and the outer ring of the wheel end disconnect. The wheel end disconnect device pawls are radially expanded in response to the request to couple a wheel to a half shaft (e.g., the request to enter four wheel drive mode). Method 1500 proceeds to exit.

At 1520, method 1500 judges if the vehicle is engaged in four wheel drive (4WD). If not, the answer is no and method 1500 proceeds to exit. Otherwise, the answer is yes and method 1500 proceeds to 1522.

At 1522, method 1500 adjusts the electric machine to conditions that may be conducive to uncouple the half shaft from the wheel hub. For example, method 1500 may reduce electric machine torque output so that half shaft speed is reduced. Method 1500 proceeds to 1524.

At 1524, method 1500 disengages the wheel end disconnect. The wheel end disconnect is engaged by withdrawing pawls that couple the inner ring and the outer ring of the wheel end disconnect. Method 1500 may radially retract the plurality of pawls included in the wheel end disconnect device in response to a request to uncouple the wheel from the half shaft. Method 1500 proceeds to 1526.

At 1526, method 1500 deactivates the electric machine that provides propulsive force to the driveline. Method 1500 proceeds to exit.

In this way, a four wheel drive system may be engaged so that torque may be delivered to all four vehicle wheels. By synchronizing half shaft speed and wheel hub speed before engaging the wheel end disconnect, it may be possible to reduce four wheel drive engagement noise and torque disturbances when entering four wheel drive mode.

The method of FIG. 15 provides for a method for operating a wheel end locking device comprising: radially expanding a plurality of pawls included in the wheel end disconnect device in response to a request to couple a wheel to a half shaft, the half shaft coupled to a propulsion source; and radially retracting the plurality of pawls included in the wheel end disconnect device in response to a request to uncouple the wheel from the half shaft. The method includes where the plurality of pawls are radially expanded via applying force to each of the plurality of pawls simultaneously via an actuator ring and a plurality of pins. The method includes where the force is provided via an electro-magnet. The method includes where the radially expanding the plurality of pawls locks an inner ring to an outer ring. The method includes where the inner ring is directly coupled to a half shaft. The method includes where the outer ring is directly coupled to a wheel hub.

In another representation, the method of FIG. 15 also provides for a method for operating a wheel end disconnect device comprising: adjusting a speed of an electric machine to adjust a half shaft rotational speed to a rotational speed of a wheel hub; radially expanding a plurality of pawls included in the wheel end disconnect device in response to the half shaft speed being within a threshold speed of a wheel hub speed, the half shaft coupled to the electric machine; and radially retracting the plurality of pawls included in the wheel end disconnect device in response to a request to uncouple the wheel from the half shaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle wheel end disconnect device, comprising:
an inner ring assembly including a radially expanding engagement mechanism; and
an outer ring including a first group of teeth for receiving the radially expanding engagement mechanism,
where the radially expanding engagement mechanism includes a plurality of pawls, and
where each of the plurality of pawls includes a cavity configured to receive an actuator pin, and where the cavity is symmetrical with respect to one of the plurality of pawls so that the one of the plurality of pawls may be positioned for clockwise or counter clockwise coupling.

2. The vehicle wheel end disconnect device of claim 1, further comprising a single actuator ring for radially extending and retracting the plurality of pawls, where the single actuator ring may be configured to actuate all pawls simultaneously or to actuate a select number of pawls.

3. The vehicle wheel end disconnect device of claim 1, where the inner ring assembly includes an inner ring, the inner ring including splines, the splines configured to receive a half shaft.

4. The vehicle wheel end disconnect device of claim 1, further comprising a second group of teeth included with the outer ring.

5. The vehicle wheel end disconnect device of claim 4, where the second group of teeth and the first group of teeth are on an inside of the outer ring.

6. The vehicle wheel end disconnect device of claim 5, further comprising a wheel hub coupled to the outer ring.

7. A vehicle wheel end disconnect device, comprising:
a spring-less mechanism including a plurality of pins for radially expanding and contracting a plurality of pawls; and
an outer ring configured to receive the plurality of pawls when the plurality of pawls are extended radially,
where the wheel end disconnect device is grease free and includes friction and corrosion coatings, where the pins maintain positive control of the plurality of pawls in each of four states including: holding the vehicle wheel end disconnect device coupled, holding the vehicle wheel end disconnect device uncoupled, changing the vehicle wheel end disconnected between coupled and uncoupled, and changing the vehicle wheel end disconnected between uncoupled and coupled, and where the plurality of pins are relieved so that rotational motion of the plurality of pawls is not impaired by the plurality of pins.

8. The vehicle wheel end disconnect device of claim 7, where each of the plurality of pawls includes a cavity to receive an actuator pin, and where the cavity is asymmetrical with respect to one of the plurality of pawls, and further comprising:
one or more seals to prevent debris from entering the vehicle wheel end disconnect device.

9. The vehicle wheel end disconnect device of claim 7, where each of the plurality of pawls includes a cavity configured to receive an actuator pin, and where the cavity is symmetrical with respect to one of the plurality of pawls so that the one of the plurality of pawls may be positioned for clockwise or counter clockwise coupling.

10. The vehicle wheel end disconnect device of claim 9, where the cavity is configured to translate linear motion of the actuator pin into radial motion of one of the plurality of pawls.

11. The vehicle wheel end disconnect device of claim 7, further comprising a plurality of guide pins coupled to the spring-less mechanism.

12. The vehicle wheel end disconnect device of claim 11, an electro-magnet for adjusting a position of the spring-less mechanism, and where a permanent magnet holds the spring-less mechanism in either a coupled or uncoupled state.

13. A method for operating a wheel end disconnect device comprising:
radially expanding a plurality of pawls included in the wheel end disconnect device in response to a request to couple a wheel to a half shaft, the half shaft coupled to a propulsion source; and
radially retracting the plurality of pawls included in the wheel end disconnect device in response to a request to uncouple the wheel from the half shaft,
where the plurality of pawls are radially expanded via applying force to each of the plurality of pawls simultaneously via an actuator ring and a plurality of pins, and
where each of the plurality of pawls includes a cavity to receive an actuator pin, and where the cavity is asymmetrical with respect to one of the plurality of pawls.

14. The method of claim 13, where the force is provided via an electro-magnet.

15. The method of claim 13, where the radially expanding the plurality of pawls locks an inner ring to an outer ring.

16. The method of claim 15, where the inner ring is directly coupled to a half shaft, and where a radial nature of coupling via the plurality of pawls allows a pitch diameter of splines on a half shaft that mate to the wheel end disconnect to be different from a pitch diameter of splines on a wheel hub.

17. The method of claim 15, where the outer ring is directly coupled to a wheel hub.

* * * * *